Oct. 1, 1935.  R. P. BROWN  2,015,839
COMPENSATED FLOW METER
Filed Dec. 19, 1928
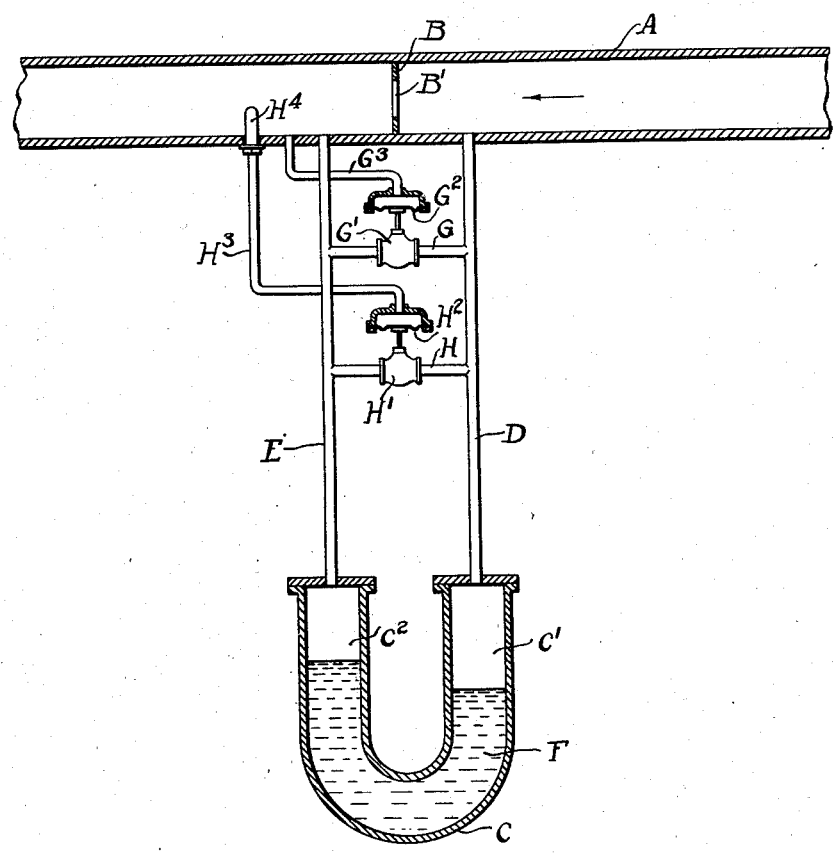
INVENTOR.
RICHARD P. BROWN
BY
ATTORNEY Patented Oct. 1, 1935

2,015,839

UNITED STATES PATENT OFFICE 2,015,839

COMPENSATED FLOW METER

Richard P. Brown, Philadelphia, Pa., assignor to The Brown Instrument Company, Philadelphia, Pa., a corporation of Pennsylvania Application December 19, 1928, Serial No. 326,964

12 Claims. (Cl. 73—167)

The present invention relates to apparatus for measuring the quantity of fluid flowing in a conduit and more particularly, to a method of and apparatus for automatically compensating such apparatus for variations in the density of the fluid being measured.

The object of my invention is to provide an improved method of and means for automatically compensating a flow meter for variations in fluid density caused by corresponding variations in the pressure and/or temperature of the fluid. Although my invention can be used in apparatus for measuring many fluids, it is particularly applicable to the measurement of steam flow and will hereinafter be described in that connection.

The various features of novelty which characterize my invention are pointed out with particularity in the claims annexed to and forming a part of this specification. For a better understanding of the invention, however, and the advantages possessed by it reference should be had to the accompanying drawing and descriptive matter in which I have illustrated and described a preferred embodiment of the invention.

The figure of the drawing is a diagrammatic representation of a portion of a flow meter installation incorporating my invention.

In measuring the flow of a fluid of fixed density in a conduit by means of a differential pressure creating device such as a "Venturi-tube" or disc orifice, the rate of flow varies as the square root of the head and the quantity of fluid flowing per unit of time is directly proportional to the velocity and density of the fluid. All flow meter recording mechanisms are initially calibrated for a definite density of the fluid to be measured and if this arbitrarily assumed density is represented as unity, then at any other density the mechanism will incorrectly indicate the amount of fluid flowing. Compensating means are therefore necessary to correct the meter reading or the meter reading must be multiplied by a factor which is proportional to the variation in density.

In fixed gases the density is directly proportional to the absolute pressure, if the temperature remains constant. If the pressure remains constant, the density will vary inversely with the absolute temperature. In condensable vapors, such as steam, the density varies with the pressure and inversely with the temperature but not in exact proportion. My invention automatically compensates the exhibiting mechanism for variations in density of the fluid being measured due to variations in pressure and/or temperature by correspondingly increasing or decreasing the pressure differential in the differential pressure device connected to the fluid conduit.

In the drawing I have diagrammatically illustrated a conduit A, in which steam is flowing in the direction indicated by the arrow. A disc B having a central orifice B' is positioned in the conduit at any desired point. A differential pressure device, shown as a U-shaped manometer C, is provided with pipes D and E connecting the high and low pressure manometer chambers C' and $C^2$, respectively, with the conduit at the high and low pressure sides of the orifice disc.

A heavy sealing liquid F such as mercury partially fills the manometer chambers C' and $C^2$ and the level of the sealing liquid in the chambers varies in proportion to the variations in the pressure differential impressed on the manometer. In normal operation the level of the sealing liquid in the high pressure chamber is always below that in the low pressure chamber. The variations in sealing liquid level in either of the chambers are transmitted to a suitable indicating and/or recording device by electrical or mechanical transmitting means. Such arrangements are well known in the art and illustration herein is unnecessary.

My improved provisions for compensating the manometer for variations in density of the fluid being measured comprise by-pass pipes G and H, connecting the manometer pipes D and E at spaced points. A control valve G' is positioned in the pipe G and connected to the under side of a diaphragm $G^2$, the upper side of which is subjected to the pressure in the conduit A at the low pressure side of the orifice disc by means of a pipe $G^3$ connected to the conduit at a point adjacent the connection of the pipe E. The valve G' is thus operated in response to variations in pressure on the low pressure side of the orifice plate.

Similarly, the by-pass pipe H is provided with a control valve H' connected to a diaphragm $H^2$ which is responsive to the expansion and contraction of an expansible liquid in a pipe $H^3$, the upper end of which is formed by a thermometer bulb $H^4$ positioned in the steam conduit. With this arrangement the valve H' is operated in response to temperature variations in the conduit A.

As pointed out heretofore the manometer exhibiting mechanism is first calibrated for a definite density of the fluid to be measured. When changes in density occur, for example by an increase or decrease in the degree of superheat or the steam or a change in pressure or both, the movement of the manometer sealing liquid would not be such as to correctly indicate the flow in exhibiting mechanism calibrated for the assumed density. The exhibiting mechanism is initially calibrated for the assumed density with the valves G' and H' partially open.

On an increase in steam pressure in the conduit, with my compensating means in operation, the pressure differential impressed on the manometer is increased by throttling the valve G'. The position of the mercury in the manometer will then correspond to the correct quantity of steam flowing and the exhibiting mechanism will then indicate the corresponding value. On a decrease in pressure the by-pass valve G' is moved toward the full open position to decrease the pressure differential in the manometer with a corresponding change in the exhibiting mechanism. On an increase in temperature of the fluid and a corresponding decrease in density, the instrument reading would be high if no compensating provisions were in effect and the valve H' is therefore opened under the action of the expansible fluid to lower the pressure differential in the manometer. A decrease in temperature effects a throttling of the valve and a corresponding increase in the pressure differential. When changes in both pressure and temperature occur, each control valve is adjusted in response thereto and the pressure differential modifying effects may in some cases be cumulative and in others in opposition. The net pressure differential modifying effect in any case provides an accurate indication of the quantity of flow in the exhibiting mechanism.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent, is:—

1. A flow meter comprising a differential pressure device having a high pressure chamber and a low pressure chamber and responsive to the differential of the respective pressures in said chambers, a conduit through which a fluid flows and by its flow makes the pressure in the conduit at one conduit point higher than at a second conduit point, a pipe connecting said high pressure chamber to the conduit at said one point, a second pipe connecting said low pressure chamber to the conduit at said second point, a by-pass connection between said pipes, and means responsive to a change in such condition of the flowing fluid as affects the relation between the weight rate of flow and the pressure differential for controlling the amount of fluid passing through said by-pass by variably restricting the latter.

2. A flow meter comprising a differential pressure device having a high pressure chamber and a low pressure chamber and responsive to the differential of the respective pressures in said chambers, a conduit through which a fluid flows and by its flow makes the pressure in the conduit at one conduit point higher than at a second conduit point, a pipe connecting said high pressure chamber to the conduit at said one point, a second pipe connecting said low pressure chamber to the conduit at said second point, a by-pass connection between said pipes, and means responsive to variations in the pressure of the flowing fluid for controlling the amount of fluid passing through said by-pass by variably restricting the latter.

3. A flow meter comprising a differential pressure device having a high pressure chamber and a low pressure chamber and responsive to the differential of the respective pressures in said chambers, a conduit through which a fluid flows and by its flow makes the pressure in the conduit at one conduit point higher than at a second conduit point, a pipe connecting said high pressure chamber to the conduit at said one point, a second pipe connecting said low pressure chamber to the conduit at said second point, a by-pass connection between said pipes, and means responsive to variations in the temperature of the flowing fluid for controlling the amount of fluid passing through said by-pass.

4. A flow meter comprising a differential pressure device having a high pressure chamber and a low pressure chamber and responsive to the differential of the respective pressures in said chambers, a conduit through which a fluid flows and by its flow makes the pressure in the conduit at one conduit point higher than at a second conduit point, a pipe connecting said high pressure chamber to the conduit at said one point, a second pipe connecting said low pressure chamber to the conduit at said second point, by-pass connections between said pipes, and means responsive to variations in the pressure and temperature of the flowing fluid for controlling the amount of fluid passing through said by-pass connections.

5. A flow meter comprising a differential pressure device having a high pressure chamber and a low pressure chamber and responsive to the differential of the respective pressures in said chambers, a conduit through which a fluid flows and by its flow makes the pressure in the conduit at one conduit point higher than at a second conduit point, a pipe connecting said high pressure chamber to the conduit at said one point, a second pipe connecting said low pressure chamber to the conduit at said second point, a by-pass connection between said pipes, and means responsive to variations in pressure of the flowing fluid for controlling the amount of fluid passing through said by-pass, said last mentioned means including a valve in said by-pass, a flexible diaphragm connected to said valve, and means for subjecting said diaphragm to the fluid pressure in said conduit.

6. A flow meter comprising a differential pressure device having a high pressure chamber and a low pressure chamber and responsive to the differential of the respective pressures in said chambers, a conduit through which a fluid flows and by its flow makes the pressure in the conduit at one conduit point higher than at a second conduit point, a pipe connecting said high pressure chamber to the conduit at said one point, a second pipe connecting said low pressure chamber to the conduit at said second point, a by-pass connection between said pipes and means responsive to variations in the temperature of flowing fluid for controlling the amount of fluid passing through said by-pass, said last mentioned means comprising a valve in said by-pass, a flexible diaphragm connected to said valve, and temperature responsive means positioned in said conduit and operatively connected to said diaphragm.

7. The method of measuring the flow of a fluid of variable density in a conduit which consists in creating pressures at different points in said conduits which differ from one another in accordance with the velocity of flow through the conduit, transmitting the pressures from said conduit, modifying the pressures so transmitted relative to one another in response to changes in the density of the flowing fluid, and measuring the difference between the pressures so modified relative to one another.

8. The method of measuring the flow of a fluid of variable density in a conduit which consists in creating pressures at different points in said conduits which differ from one another in accordance with the velocity of flow through the conduit, transmitting the pressures from said conduit, modifying the pressures so transmitted relative to one another in response to changes in the temperature of the pressure of the flowing fluid, and measuring the difference between the pressures so modified relative to one another.

9. The method of measuring the flow of a fluid of variable density in a conduit which consists in creating pressures at different points in said conduits which differ from one another in accordance with the velocity of flow through the conduit, transmitting the pressures from said conduit, modifying the pressures so transmitted relative to one another in response to changes in the pressure of the flowing fluid, and measuring the difference between the pressures so modified relative to one another.

10. A flow meter comprising conduit including a restricted portion, a differential pressure device comprising two pressure chambers and responsive to the differential of the respective pressures in said chambers, a pipe connecting one of said chambers to the conduit at one side of said restricted portion, a second pipe connecting the other chamber to said conduit at the opposite side of said restricted portion, and means automatically responsive to variations in such a physical condition of the fluid as affects the relation between the weight rate of flow and the pressure differential for by-passing fluid from the conduit about said restricted portion to thereby modify the pressure differential impressed on said differential pressure device by a given velocity of fluid flow through the conduit.

11. The method of measuring the flow of a fluid of variable density in a conduit which consists in creating pressures at different points in said conduits which differ from one another in accordance with the velocity of flow through the conduit, transmitting the pressures from said conduit, modifying the pressures so transmitted relative to one another in response to and to compensate for changes in condition of the fluid flowing which vary the relation between the weight rate of flow and the differences between said pressures at said points, and measuring the difference between the pressures so modified relative to one another.

12. A meter for measuring the flow of a fluid of variable density comprising a conduit including means creating pressures at different points in said conduit which differ from one another in accordance with the velocity of flow through the conduit, means for measuring differential pressures including fluid transmitting means connected to said different points, and means responsive to variations in density of the flowing fluid, connected to said fluid transmitting means for varying the pressures transmitted from said two points.

RICHARD P. BROWN.